(12) United States Patent
Jones

(10) Patent No.: US 6,651,633 B1
(45) Date of Patent: *Nov. 25, 2003

(54) CENTRIFUGAL COMPRESSOR HAVING COMPOUND BEARING ASSEMBLY

(75) Inventor: Daniel W. Jones, Lenexa, KS (US)

(73) Assignee: Accessible Technologies, Inc., Lenexa, KS (US)

( * ) Notice: Subject to any disclaimer, the term of this patent is extended or adjusted under 35 U.S.C. 154(b) by 38 days.

This patent is subject to a terminal disclaimer.

(21) Appl. No.: 09/683,871

(22) Filed: Feb. 26, 2002

Related U.S. Application Data (63) Continuation-in-part of application No. 09/706,007, filed on Nov. 3, 2000.

(51) Int. Cl.[7] ............................................... F02B 33/00
(52) U.S. Cl. ..................... 123/559.1; 384/461
(58) Field of Search ........................ 123/559.1; 384/461

(56) References Cited

U.S. PATENT DOCUMENTS

| | | | | |
|---|---|---|---|---|
| 596,310 A | * | 12/1897 | Thomas | 384/461 |
| 862,679 A | * | 8/1907 | Thames | 384/515 |
| 1,433,014 A | * | 10/1922 | Kennedy | 384/461 |
| 1,506,856 A | * | 9/1924 | McCluskey | 384/461 |
| 1,539,702 A | * | 5/1925 | Szuba | 384/461 |
| 2,822,225 A | * | 2/1958 | Teufel | 384/461 |
| 3,597,029 A | * | 8/1971 | Marcum | 384/461 |
| 3,737,202 A | * | 6/1973 | Rosales | 384/461 |
| 5,138,477 A | * | 8/1992 | Omura et al. | 359/200 |
| 5,224,459 A | * | 7/1993 | Middlebrook | 123/559.1 |
| 5,887,576 A | * | 3/1999 | Wheeler et al. | 123/559.1 |
| 6,478,469 B1 | * | 11/2002 | Jones | 384/461 |

* cited by examiner

*Primary Examiner*—Hoang Nguyen
(74) *Attorney, Agent, or Firm*—Hovey Williams LLP

(57) ABSTRACT

A centrifugal supercharger includes a case, a rotatable impeller, a high speed shaft drivingly coupled between the impeller and the engine, and a multiple bearing arrangement rotatably supporting the shaft on the case. The bearing arrangement includes a shaft bearing and a case bearing, each of which includes at least one set of relatively rotatable inner and outer races. The inner race of the shaft bearing is fixed relative to the shaft. The outer race of the case bearing is fixed relative to the case. The outer race of the shaft bearing and inner race of the case bearing are fixed relative to one another either by a spacer or by an integral, unitary construction. In addition, at least one of the bearings can include dual components (inner and outer races and ball rings). The ball rings of the shaft and case bearings can be coplanar to one an other or offset therefrom. A compressor having a compound bearing assembly is also disclosed. As part of the compressor, the compound bearing assembly is utilized in exceptional and inventive operating conditions.

58 Claims, 6 Drawing Sheets

CENTRIFUGAL COMPRESSOR HAVING COMPOUND BEARING ASSEMBLY

CROSS REFERENCE TO RELATED APPLICATIONS

This is a continuation-in-part of application Ser. No. 09/706,007, filed Nov. 3, 2000, which is hereby incorporated by reference herein.

BACKGROUND OF INVENTION

1. Field of the Invention

The present invention relates generally to centrifugal compressors, such as a centrifugal supercharger for providing increased airflow to an engine. More particularly, the present invention concerns a compound bearing assembly for a centrifugal compressor. The inventive multiple bearing arrangement is specifically configured for use in extremely high acceleration and velocity conditions and provides relatively low velocity variances among the assembly components.

2. Discussion of Prior Art

The impeller of a centrifugal compressor is often accelerated very quickly and rotated at extremely high speeds. Such conditions are particularly prevalent in some superchargers. For example, in some superchargers, the impeller is accelerated in excess of 80,000 rpm in much less than a second. It is also noteworthy that clearance between the impeller and compressor chamber wall is typically quite small (e.g., less than six thousands of an inch). In this regard, rotation of the impeller must be tightly restricted and controlled about its rotational axis. Impeller "slop" is of particular concern in superchargers utilizing a cantilevered impeller (i.e., an impeller fixed on a cantilevered section of a support shaft). The bearing assemblies used to support the impeller shaft must therefore be capable of withstanding high accelerations and velocities without permitting untoward eccentric movement of the impeller relative to the rotational axis.

It is commonly believed that bearing assemblies used in high speed and high acceleration applications must be specially configured and/or formed of unique and expensive materials. For example, traditional high speed bearings often have specially shaped races designed to withstand the tremendous loads typically associated with extreme speed and acceleration applications. Those ordinarily skilled in the art will appreciate that one such bearing assembly (referred to as an "angular contact bearing") includes inner and outer races having raised, diametrically opposed (relative to the balls) projections along opposite sides of the bearing which are engaged by the balls (as opposed to a so-called "radial bearing" in which the balls contact the races along only a generally radial line relative to the rotational axis of the bearing). It is also conventional wisdom to form the bearing of high strength, heat resistant materials such as ceramics. Yet further, it is traditionally believed that bearing assemblies used in high speed and acceleration applications should be relatively light. Conventional wisdom further suggests that an axial preload is necessary in high speed conditions to minimize ball skidding and equally load the balls.

Preloading of the bearing is also believed to be particularly important with respect to precisely locating the impeller within the compressor chamber. That is to say, the bearings used to support a high speed impeller shaft of a conventional compressor are highly preloaded (e.g., with a spring) to reduce bearing deflection and take up internal play (e.g., play attributable to manufacturing tolerances and/or inaccuracies). Those skilled in the art will certainly appreciate that impeller "slop," particularly in the case of a cantilevered impeller, is highly undesirable and conventional compressors utilize well-accepted principles to avoid this problem. Moreover, no conventional high speed compressor is known to have utilized a compound bearing to support the impeller shaft, as such a configuration inherently has greater slop than a single bearing and is counterintuitive.

SUMMARY OF INVENTION

In accordance with the objects evident from the description herein, the present invention concerns a compressor that generally includes a case, a rotatable impeller operable to compress a fluid within the case when rotated, a shaft fixed relative to the impeller, a compound bearing assembly rotatably supporting the shaft on the case. The compound bearing assembly includes a shaft bearing and a case bearing. The shaft and case bearings each include relatively moveable inner and outer races, a cage, and a plurality of balls rotatably positioned within the cage between the races. The inner race of the shaft bearing is fixed relative to the shaft, the outer race of the case bearing is fixed relative to the case, and the outer race of the shaft bearing and inner race of the case are being fixed relative to one another. At least one of the cages of the bearings is selected from the group consisting of a nylon cage that is formed of nylon and presents a plurality ball-receiving openings, and a steel cage that includes a pair of interconnected sections which are formed of steel and cooperatively present a plurality of ball-receiving holes. The at least one of the cages is associated with a respective one of the bearings that has a ball pitch line velocity of at least about 3000 feet per minute ("fpm") during operation of the impeller.

Another aspect of the present invention involves at least one of the shaft and case bearings having a radial configuration, with the races of the at least one of the bearings presenting opposed ball-receiving grooves that are aligned along a radial line that projects at least substantially radially from the rotational axis. In the inventive compressor, the at least one of the bearings has a ball pitch line velocity of at least about 5500 feet per minute during operation of the impeller.

The present invention also concerns forming the balls of both the shaft and case bearings of steel. In the inventive compressor, at least one of the bearings has a ball pitch line velocity of at least about 8000 fpm during operation of the impeller.

Yet another aspect of the present invention involves a unique cage design for a compressor. Particularly, the cage of at least one of the shaft and case bearings includes an annular wall that presents a plurality ball-receiving openings. The inventive cage further includes a pair of radial projections extending at least substantially around the circumference of the wall, with the ball-receiving openings being located between the projections.

The present invention also more specifically concerns a centrifugal supercharger for supercharging an engine of a vehicle. The inventive supercharger generally comprises a case, a rotatable impeller operable to compress induction fluid for the engine when rotated, a shaft fixed relative to the impeller and drivingly connectable to the engine, and a compound bearing assembly rotatably supporting the shaft on the case. The compound bearing assembly includes a radially innermost race fixed relative to the shaft, a radially outermost race fixed relative to the case, and an integrally formed common race assembly spaced radially between the innermost and outermost races. The common race assembly is moveable relative to the innermost and outermost races. The common race assembly presents an inside race associated with the innermost race and an outside race associated with the outermost race. The common race weighs an amount that is equal to or less than about one and one-half times the weight of the innermost race.

In another aspect of the present invention, the inner race of the case bearing and outer race of the shaft bearing are not integrally formed, but rather a coupler is located between and fixedly interconnects the outer race of the shaft bearing and the inner race of the case bearing. The coupler has a coefficient of thermal expansion that is greater than the coefficient(s) of thermal expansion for the outer race of the shaft bearing and the inner race of the case bearing. The coupler also weighs less than each of the outer race of the shaft bearing and the inner race of the case bearing.

The present invention also concerns a method of rotatably mounting an impeller shaft of a centrifugal supercharger in a supercharger case. The method involves providing a case bearing having an inner diameter and a shaft bearing having an outer diameter that is greater than the inner diameter. At least one of the bearings is altered so that the outer diameter of the shaft bearing is smaller than the inner diameter of the case bearing, thereby permitting the shaft bearing to fit within the case bearing. The inner race of the case bearing is fixed to the outer race of the shaft bearing, the outer race of the case bearing is fixed to the case of the supercharger, and the inner race of the shaft bearing if fixed to the impeller shaft.

Another aspect of the present invention involves forming both the shaft and case bearings as ball-type bearings. More particularly, the shaft bearing is a standard 300 Series bearing.

The present invention also involves a supercharger including a pair of spaced apart bearing assemblies supporting the impeller shaft on the case. A first one of the pair of bearing assemblies comprises a compound bearing assembly that includes a first shaft bearing and a radially outward first case bearing. A second one of the pair of bearing assemblies includes a second shaft bearing. The inner race of the first shaft bearing is fixed relative to the shaft, the outer race of the first case bearing is fixed relative to the case, and the outer race of the first shaft bearing and inner race of the first case bearing are fixed relative to one another. In one aspect of the present invention, the inner race of the second shaft bearing is fixed relative to the shaft and the outer race of the second shaft bearing is fixed relative to the case. In another aspect of the present invention, the bearings each include ball ring that includes a cage and a plurality of balls rotatably positioned within the cage between the respective races. Moreover, the second shaft bearing weighs less than the first shaft bearing.

It is another aspect of the present invention to provide a supercharger with a compound bearing assembly for rotatably supporting the impeller shaft, wherein the shaft and case bearings each include relatively moveable inner and outer races, a cage, and a plurality of balls rotatably positioned within the cage between the races. The case bearing presents a case bearing weight. The compound bearing assembly is axially preloaded to a preload amount, wherein the preload amount is determined according to the equation: preload amount $\leq 38 \times$(case bearing weight)$^{0.82}$.

The present invention alternatively concerns a supercharger having a compound bearing assembly for rotatably supporting the impeller shaft, wherein the bearing assembly is under substantially no axial preload.

A further aspect of the present invention concerns a supercharger having an impeller shaft that presents a cantilevered section, with the impeller being located on the cantilevered section. The inner race of the shaft bearing presents an inside shaft-engaging surface that is rotated at speeds of at least about 5500 fpm during operation of the impeller.

In addition, an aspect of the present invention involves a supercharger having a cantilevered impeller and a compound bearing assembly rotatably supporting the impeller shaft. The bearing assembly includes a shaft bearing and a radially outward case bearing, each of which includes relatively moveable inner and outer races, a cage, and a plurality of balls rotatably positioned within the cage between the races. The balls of the shaft bearing present a common diameter that is equal to or greater than the common diameter of the balls of the case bearing.

Other aspects and advantages of the present invention will be apparent from the following detailed description of the preferred embodiment and the accompanying drawing figures.

BRIEF DESCRIPTION OF DRAWINGS

Several embodiments of the invention are described in detail below with reference to the attached drawing figures, wherein.

DETAILED DESCRIPTION

Figures 1, 2:
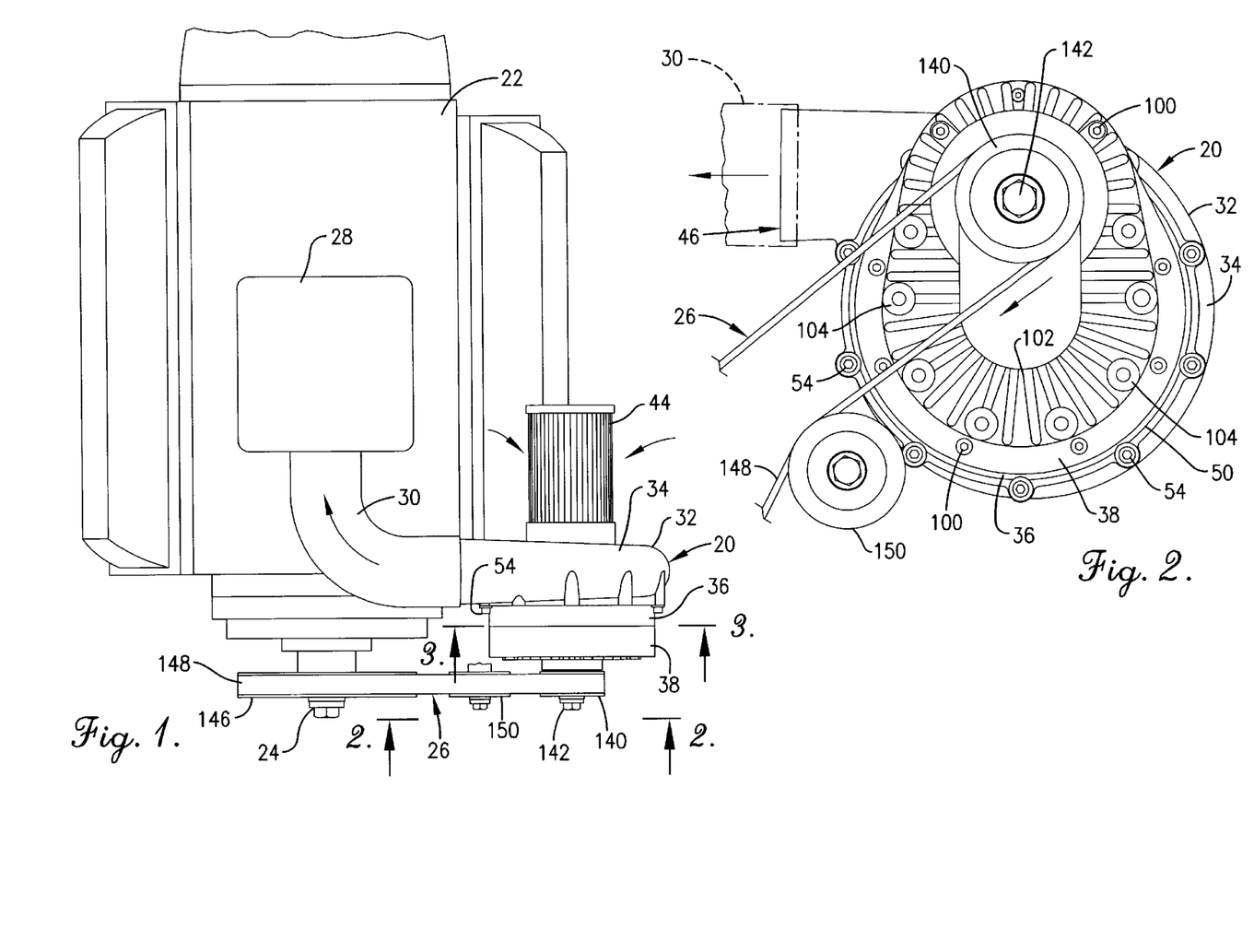
FIG. 1 is a fragmentary, partially schematic plan view of an internal combustion engine including a centrifugal supercharger constructed in accordance with the principles of the present invention.
FIG. 2 is an enlarged, fragmentary front elevational view of the engine taken along line 2—2 of FIG. 1.

Turning initially to FIG. 1, the supercharger 20 selected for illustration is shown in use with an internal combustion engine 22 of a vehicle such as a boat or automobile. Although the illustrated engine 22 has eight cylinders, the principles of the present invention are equally applicable to various other types of engines. It is noted, however, that the supercharger 20 is preferably driven directly by the engine 22, with the crankshaft 24 and a belt drive 26 providing driving power to the supercharger 20. Moreover, the supercharger 20 is connected to the engine intake 28 (e.g., an intake plenum box) by a conduit 30, such that pressurized air generated by the supercharger 20 is directed to the intake 28. Again, the principles of the present invention are not limited to the illustrated application, but rather the inventive supercharger 20 may be associated with any system in which a highly pressurized air stream is desired. For example, it is entirely within the ambit of the present invention to utilize the supercharger 20 in various other types of reciprocating engines.

The illustrated supercharger 20 includes a case 32 that defines compressor and transmission chambers as identified hereinbelow. As perhaps best shown in FIG. 4, the preferred case 32 generally includes three main sections 34, 36, 38 that are formed of any suitable material (e.g., polished cast steel) and interconnected as will be described.

The case sections 34 and 36 cooperate to define a compressor chamber 40 in which incoming fluid (e.g., air, air/fuel mixture, etc.) is pressurized and accelerated.

The case section 34 presents a central inlet opening 42 (see FIG. 4) through which fluid enters the chamber 40. A filter 44 (see FIG. 1) is preferably provided at the inlet opening 42, as shown, or somewhere upstream from the opening 42. Although not illustrated, the inlet opening 42 may alternatively communicate with a forwardly open conduit (not shown) that extends toward the front of the powered vehicle, such that air flow to the supercharger 20 is facilitated when the vehicle is moving in a forward direction. The case section 34 is configured in such a manner that a portion 40a of the compressor chamber 40 extends circumferentially around the inlet opening 42 to form a volute of progressively increasing diameter. The volute portion 40a of the compressor chamber 40 terminates at a tangential outlet opening 46 (see FIGS. 2 and 3), with the latter communicating with the engine intake 28 via conduit 30 (see also FIG. 1). In this regard, fluid entering the illustrated compressor chamber 40 flows axially through the inlet opening 42, is propelled generally radially into the volute portion 40a, and then directed along a generally circular path to the outlet opening 46.

Figure 4:
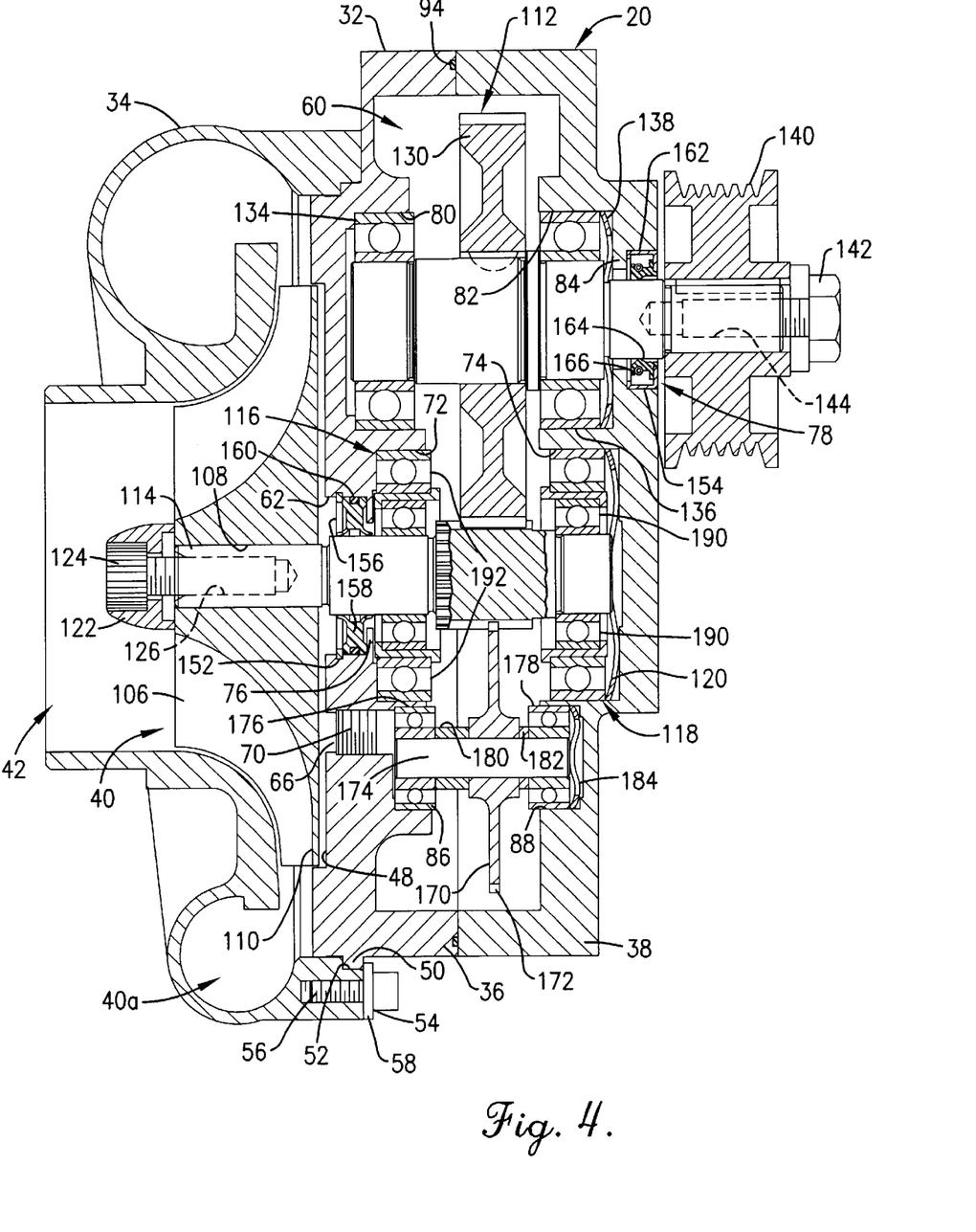
FIG. 4 is an even further enlarged cross-sectional view of the supercharger taken generally along line 4—4 of FIG. 3, particularly illustrating the multiple bearing arrangements supporting the impeller shaft.

As shown in FIG. 4, the case section 36 presents a circular recess 48 for purposes which will be described. In addition, the section 36 presents an outwardly projecting lip 50 that extends partly around the perimeter thereof (e.g., see FIGS. 2 and 4). The lip 50 is received in a complemental groove 52 defined in the case section 34, and a plurality of fastener assemblies 54 serve to secure the case sections 34 and 36 to one another. As particularly shown in FIG. 4, each of the fastener assemblies 54 preferably includes a threaded screw 56 received in the case section 34 and a washer 58 pressed against the lip 50.

Figure 3:
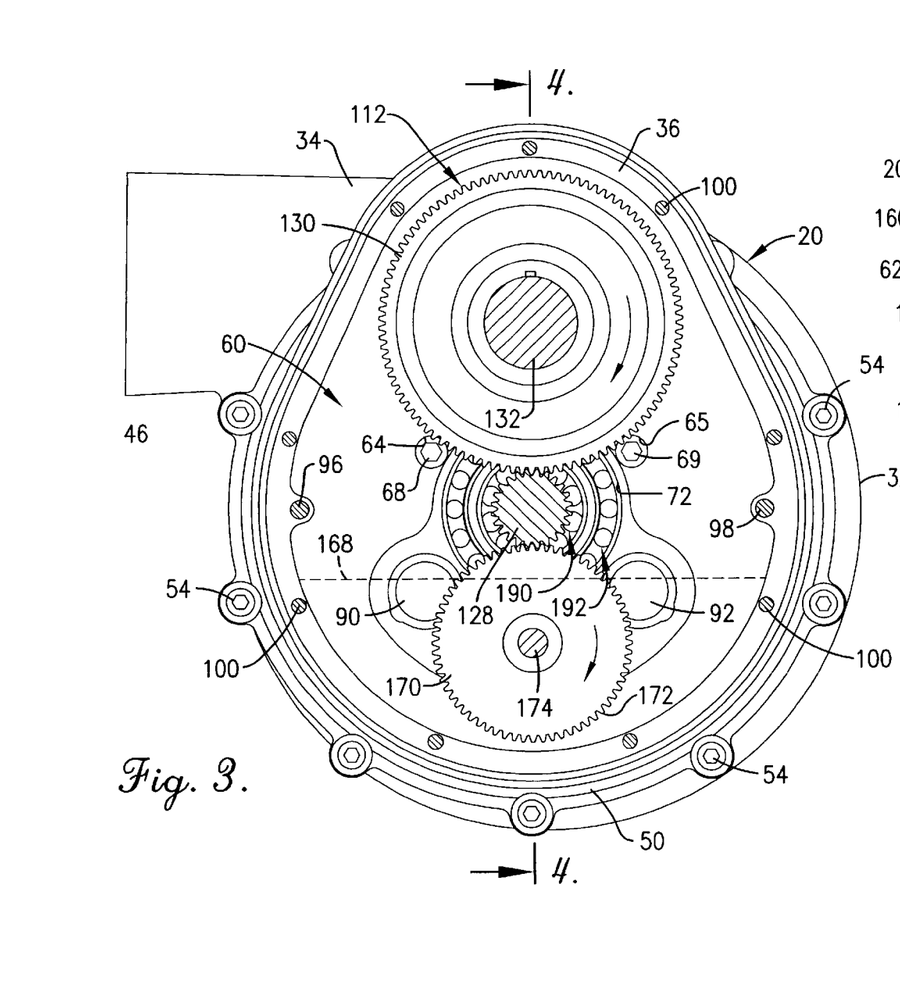
FIG. 3 is an enlarged cross-sectional view of the supercharger taken generally along line 3—3 of FIG. 1, particularly illustrating the transmission chamber and the components located therein.

The middle case section 36 also cooperates with the case section 38 to define a transmission chamber 60 (see FIGS. 3 and 4). As particularly shown in FIG. 3, the transmission chamber 60 is preferably teardrop shaped, with the bottom being wider than the top. An impeller shaft opening 62 that is concentric with the inlet opening 42 extends through the case section 36 from the compressor chamber 40 to the transmission chamber 60. A set of internally threaded passageways 64,65,66 also extend through the case section 36, with each of the passageways 64,65,66 normally being sealed by a respective threaded plug 68,69,70. Except for the shaft opening 62 and the passageways 64,65,66, the chambers 40 and 60 are otherwise separated from one another by the case section 36. Defined in the case sections 36 and 38 in axial alignment with the shaft opening 62 are a pair of opposed bearing assembly sockets 72 and 74. An inwardly projecting dividing wall 76 is located along the shaft opening 62 to present a seal recess for purposes which will be described.

The case section 38 similarly includes an input shaft opening 78 that is spaced upwardly from the bearing assembly socket 74. Similar to the impeller shaft opening 62, the input shaft opening 78 is axially aligned with opposed bearing assembly sockets 80 and 82 defined in the case sections 36 and 38. There is likewise an inwardly projecting dividing wall 84 alongside the bearing assembly socket 82 to present a seal recess as will be described. In the preferred embodiment, a pair of opposed, relatively small bearing assembly sockets 86 and 88 defined in the case sections 36 and 38 are utilized, although two additional pairs of sockets 90 and 92 (only the sockets defined in the case section 36 being shown in FIG. 3) are provided in the transmission chamber 60. The three pairs of sockets permit the supercharger to be mounted at various angles, while ensuring sufficient and effective dispersion of lubrication fluid within the transmission chamber 60. It is noted that the passageway 66 projects from the center socket 86 (see FIG. 4).

An endless O-ring 94 retained within a continuous groove defined in the case section 36 provides a seal between the case sections 36 and 38 (see FIG. 4). A pair of alignment rods 96 and 98 (see FIG. 3) ensure proper positioning of the case sections 36 and 38 relative to one another, as well as a series of attachment screws 100 (see also FIG. 2). As particularly shown in FIG. 2, the illustrated case section 38 presents a finned outer face 102 for promoting heat exchange between the transmission chamber, particularly the lubrication fluid, and atmosphere. The outer face 102 is also provided with a plurality of mounting bosses 104, each being tapped so that a mounting bolt (not shown) may be threaded therein to fasten the supercharger 20 to a mounting bracket (also not shown) fixed to the engine 22.

In the usual manner, the supercharger 20 includes a rotatable impeller 106 located within the compressor chamber 40 (see FIG. 4). The impeller 106 is preferably machined from a billet of 7075 T-6 aircraft aluminum, although other suitable materials (e.g., cast aluminum) may be used. It is further preferred to use the impeller commercially available from the assignee of record of the invention claimed herein. However, the impeller 106 may be variously configured without departing from the spirit of the present invention. With respect to the preferred embodiment, the impeller 106, regardless of its design, induces and causes fluid to flow through the compressor chamber 40 as hereinabove described. It is particularly noted that the impeller 106 is provided with a central mounting hole 108. In addition, the impeller 106 has a circular, solid base 110 that spans and is received in the recess 48.

The impeller 106 is drivingly connected to the belt drive 26 of the engine 22 by a transmission 112 located generally in the transmission chamber 60. The transmission 112 may be variously configured but at least some component(s) thereof preferably require(s) continuous lubrication during operation.

As discussed in detail below, in the preferred embodiment, the transmission 112 includes an impeller shaft 114 rotatably supported by a pair of bearing assemblies 116 and 118 press fit within the respective sockets 72 and 74. In the usual manner, a wavy spring washer 120 is provided in at least one of the sockets 72 and 74. As will be described, the bearing assemblies 116 and 118 have an inventive construction that serves to extend bearing life without sacrificing speed of the shaft 114, cost or simplicity in construction.

The illustrated impeller shaft 114 projects through the opening 62 and into the compressor chamber 40. The mounting hole 108 of the impeller 106 receives the end of the shaft 114 therein, with the impeller 106 preferably being pressed onto the shaft 114 and retained thereon by a cap 122. It is noted that the cap 122 is secured in place by a screw 124 threaded into an axial bore 126 of the shaft 114. In the illustrated embodiment, the shaft 114 presents a cantilevered section (i.e., the portion of the shaft 114 projecting leftwardly beyond the bearing assembly 116 when viewing FIG. 4) on which the impeller 106 is mounted. However, it is entirely within the ambit of the present invention to alternatively support the impeller shaft 114 on both sides of the impeller 106. For example, a suitable alternative construction might involve lengthening the impeller shaft so that it projects beyond the impeller and providing a bearing assembly in the compressor chamber between the shaft and case.

When it is desired to remove the impeller 106 from the shaft 114, the outer case section 34 is detached from the middle case section 36 and the retaining screw 124 and cap 122 are removed. The plugs 68,69,70 are also unscrewed from their respective passageways 64,65,66. A tool may then be inserted through one or all of the passageways 68,69,70 to engage the impeller base 110 and force the impeller 106 off the end of the shaft 114. This might require a significant removal force because the impeller 106 is preferably press fit onto the shaft 114.

The impeller shaft 114 is preferably machined to present a pinion 128 located between the bearing assemblies 116 and 118. The pinion 128 intermeshes with a relatively larger gear 130 supported by an input shaft 132. The gear 130 is preferably keyed to the shaft 132, although these components may be fixedly interconnected in any other suitable manner. Similar to the impeller shaft 114, a pair of bearing assemblies 134 and 136 press fit within respective ones of the sockets 80 and 82 rotatably support the input shaft 132. Additionally, a wavy spring washer 138 is provided in the socket 82 adjacent the dividing wall 84. The input shaft 132 projects through the shaft opening 78 and beyond the outer face 102 of the case section 38. The belt drive 26 includes a driven sheave 140 keyed to the outwardly projecting portion of the input shaft 132. The driven sheave 140 is further retained on the shaft 132 by a screw 142 threaded into an axial bore 144 of the shaft 132. The illustrated belt drive 26 further includes a drive sheave 146 fixed to the crank shaft 24, a belt 148 entraining the sheaves 140 and 146, and an idler sheave 150 suitably tensioning the belt 148. Thus, rotation of the crank shaft 24 effects rotation of the impeller 106.

Those ordinarily skilled in the art will appreciate that the gear-type transmission 112 of the preferred embodiment produces noise that is noticeably greater than a belt drive. It has been determined that the impeller 106 actually amplifies the noise of the transmission 112, and the noise typically associated with a gear driven supercharger is normally considered undesirable. In this regard, the impeller shaft 114 may be designed to dampen noise that might otherwise propagate through the shaft 114 to the impeller 106. Such a shaft construction is disclosed in filed application for U.S. Letters Patent Ser. No. 09/669,018, filed Sep. 22, 2000, entitled GEAR DRIVEN SUPERCHARGER HAVING NOISE REDUCING IMPELLER SHAFT, which is hereby incorporated by reference herein as is necessary for a full and complete understanding of the present invention.

The pinion 128 is significantly smaller than the drive gear 130 so that the transmission provides a significant step up in rotational speed between the input shaft 132 and impeller shaft 114. For example, during regular operation of the supercharger 20, the illustrated shaft 114 and pinion 128 will reach speeds of up to 30,000 to 70,000 rpm. A suitable pinion 128 diameter is approximately 1.2 inches, with the drive gear 130 being about three times that size.

Because lubrication fluid will be dispersed throughout the transmission chamber 60 in the manner described below, seal assemblies 152 and 154 are provided at the shaft openings 68 and 78, respectively. Turning first to the impeller shaft seal assembly 152, a retaining ring 156 maintains a seal 158 against the dividing wall 76. The seal 158 is provided with a circumferential O-ring 160 that sealingly engages the case section 34. The seal 158 is formed of any suitable material, such as that available under the designation "TEFLON", and preferably provides double or redundant sealing contact with a seal ring 161 of the impeller shaft 114. On the other hand, the input shaft seal assembly 154 includes a metal case 162 press fit within the case section 38 against the dividing wall 84. The case 162 houses a rubber seal 164 that is sealingly retained between the input shaft 132 and case 162 by a spring 166. The illustrated seal assemblies 152 and 154 are preferred but shall be considered as illustrative only, and the principles of the present invention are equally applicable to a supercharger using various other types of seals.

Those ordinarily skilled in the art will appreciate that the gears 128,130 and, in the preferred embodiment, the bearing assemblies 116,118,134,136 require lubrication during operation. The supercharger 20 is preferably self-contained such that lubrication of the transmission is provided exclusively by a lubricant contained entirely within the transmission chamber 60. The transmission chamber 60 includes a lubricant reservoir portion that is preferably located below the transmission 112. A dashed line 168 in FIG. 3 represents the top boundary of the reservoir portion of the transmission chamber 60, as well as the surface of the fluid contained within the transmission chamber 60. That is to say, the quantity of fluid within the transmission chamber 60 essentially defines the fluid reservoir portion.

A lubricant slinging disc 170 projects into the reservoir portion so as to be partly submerged in the lubricant. The illustrated disc 170 includes an outer toothed edge 172 that intermeshes with the pinion 128 so that the disc 170 is rotated by the transmission 112. Such an arrangement is disclosed in filed application for U.S. Letters Patent Ser. No. 09/668,223, filed Sep. 22, 2000, entitled CENTRIFUGAL SUPERCHARGER HAVING LUBRICATING SLINGER, which is hereby incorporated by reference herein as is necessary for a full and complete understanding of the present invention. As shown in FIG. 4, the disc 120 is suitably fixed (i.e., press fit) to a shaft 174 and positioned between a pair of bearing assemblies 176 and 178 by respective spacers 180 and 182. The bearing assemblies 176 and 178 are press fit within respective ones of the sockets 86 and 88 and thereby serve to rotatably support the shaft 174 and disc 170 within the transmission chamber 60. As with the other shaft assemblies, a wavy spring washer 184 is provided in the socket 88 adjacent the bearing assembly 178.

As noted in the incorporated application, the disc 170 creates a highly desirable lubricating mist within the transmission chamber 60. The mist ensures that the transmission components (i.e., the gears 128,130 and the bearing assemblies 116,118,134,136) are adequately lubricated without creating undesirable hydraulic separation forces.

However, the principles of the present invention are equally applicable to various other supercharger lubrication systems. That is, the present invention is preferably utilized with a self-contained supercharger having a partly filled transmission chamber, although the inventive features can be employed in a supercharger using an outside lubrication source or a supercharger having a fully filled transmission chamber. For example, it is entirely within the ambit of the present invention to lubricate the transmission with engine lubricant or a recirculating lubrication system dedicated to the supercharger. The alternative supercharger may also include wicks or jet sprayers, rather than the slinging disc 170, for directing lubricant to the transmission components. It is again noted, however, that the illustrated lubrication system is most preferred because a failure of the transmission 112 (e.g., metal fragments produced by broken gear teeth, shaft failures, etc.) do not damage the engine 20. It is further noted that any one of the bearing assemblies 116, 118,134,136,176,178 may be pre-lubricated such that lubrication during operation is unnecessary.

Those ordinarily skilled in the art will appreciate that because the shaft 114 is required to rotate at extremely high speeds in order to produce the desired boost, achieving effective, durable rotational support for the shaft 114 is problematic. The specified limits of ball bearing assemblies are commonly exceeded in conventional supercharger applications thereby greatly increasing the risk of premature bearing fatigue and a reduced life span of the supercharger.

Responsive to these problems, the present invention utilizes a multiple bearing arrangement in each of the bearing assemblies 116 and 118. It will be appreciated that the bearing assemblies 116 and 118 are virtually mirror images of one another. Thus, for the sake of brevity, only the assembly 116 received in the socket 72 will be detailedly described herein with the understanding that the assembly 118 is similarly constructed. The multiple bearing arrangement includes a shaft bearing 190 and a case bearing 192. As illustrated, each of the bearings 190 and 192 may essentially comprise a standard ball bearing assembly. The bearings 190 and 192 are staged, i.e. arranged to share the responsibility of rotatably supporting the shaft 114 on the case sections 36 and 38. That is to say, the bearings 190 and 192 are intercoupled by a spacer 194 in such a manner that the entire velocity variance between the shaft 114 and case 32 (e.g., 350 ft./sec vs. the relatively stationary case) is shared by two bearing assemblies. It is believed that this configuration maintains the variable velocities of the bearing components within each bearing in tolerable ranges, even though the overall velocity variance between the shaft and the case are above most bearing assembly operational limitations.

Figure 5:
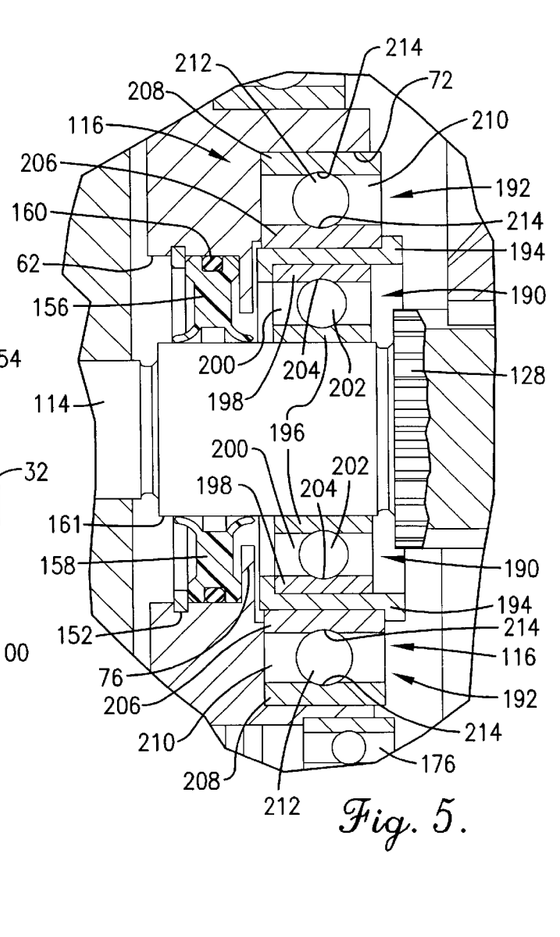
FIG. 5 is a greatly enlarged, fragmentary cross-sectional view of the impeller shaft and one of the multiple bearing arrangements.

Turning now to FIG. 5, the shaft bearing 190 includes an inner race 196. The inner race 196 is fixed relative to the shaft 114. The inner race 196 must be dimensioned to allow the shaft bearing 190 to be press fit onto the journal portion of the shaft 114. In the preferred embodiment the inner race 196 is cylindrical in shape, matching the cylindrical shape of the journal portion of the shaft 114. The inside diameter of the inner race 196 is just slightly greater than the outside diameter of the journal portion of the shaft 114. The inner race 196 of the shaft bearing 190 could be any size and shape so long as it sufficiently matches the shape and size of the journal portion of the shaft 114 to allow the inner race 196 to be fixed relative to the shaft 114. The inner race 196 must also be configured to allow cooperation with the other components of the bearing assembly 116 to provide adequate rotational support of the shaft 114. Although the preferred embodiment utilizes a press fit as the means to fix the inner race 196 relative to the shaft 114, any method of sufficiently affixing the inner race 196 to the shaft 114 could be implemented (e.g., the inner race could alternatively be machined as an integral part of the shaft).

The shaft bearing 190 further includes an outer race 198. The outer race 198 matches the shape of the inner race 196 and in the preferred embodiment is cylindrically shaped. In the preferred embodiment, the diameter of the outer race 198 is greater than the diameter of the inner race 196 and is defined in the same radial plane relative to the shaft. The diameter of the outer race 196 defines an exterior dimension for the shaft bearing 190, the relevance of which will become apparent as discussed below. However, the terms "inner" and "outer" as used herein to describe the preferred embodiment were selected to facilitate clarity of the description and do not necessarily describe relative radial positions. For example, it is well within the ambit of the present invention that the inner and outer races could be configured so that the inner race is positioned, or at least a portion thereof, radially outward (relative to rotational axis of the shaft) from part or all of the outer race.

Interposed between the inner race 196 and the outer race 198 is shaft bearing ball ring 200. The ball ring 200 includes shaft bearing balls 202 and a shaft bearing cage (not shown). Each of the races 196 and 198 includes a curvilinear groove 204, with the grooves 204 cooperatively defining a circular opening in which the ring 200 is received. The inner race 196 and outer race 198 must be dimensioned to allow the balls 202 to contact the inner race 196 and the outer race 198 along the grooves 204 for rotational support of the shaft 114. The balls 202 run in the curvilinear grooves 204 of the races 196 and 198 and generally define a radial plane relative to the shaft 114. The cage is configured to separate the balls 202 and maintain even spacing between the balls 202 in order to prevent the balls 202 from touching one another. The balls 202 and races 196 and 198 can be constructed of any material that provides the desired rotational support of the shaft 114, rotational speed and bearing life, for example high-carbon chromium steel 52100 heat treated to high strength and hardness and smoothly ground and polished.

Similar to the shaft bearing 190, the case bearing 192 includes inner race 206, outer race 208 and ball ring 210 interposed between the inner race 206 and the outer race 208. Subject to the differences described below, the case bearing inner and outer races 206 and 208 and the ball ring 210 are configured in the same manner as the shaft bearing inner and outer races 196 and 198 and the ball ring 200. That is to say, the case bearing ball ring 210 includes case bearing balls 212 that run in curvilinear grooves 214 of the races 206 and 208 and generally define a radial plane relative to the shaft 114. Although not shown, the case bearing ball ring 210 also includes a cage for separating the balls 212. In the preferred embodiment, the races 206 and 208 are cylindrically shaped with the diameter of the outer race 208 being greater than the diameter of the inner race 206. In the preferred embodiment, the radii of the case bearing balls 212 are greater than the radii of the shaft bearing balls 202, although the principles of the present invention are not limited to this size relationship.

The case bearing inner race 206 is fixed relative to the shaft bearing outer race 198. In the preferred embodiment, the case bearing inner race 206 and shaft bearing outer race are fixed to the spacer 194 (see FIG. 5). The spacer 194 has a tubular configuration, dimensioned to fit contiguously between the inner race 206 of the case bearing 192 and the outer race 198 of the shaft bearing 190. One advantage of utilizing the spacer 194 is that it allows common commercially manufactured bearings to be used for the shaft bearing 190 and the case bearing 192. That is to say, these bearings do not have to be specially manufactured to specification, but rather the spacer 194 need only be machined and dimensioned to accommodate the pre-manufactured dimensions of the shaft bearing 190 and the case bearing 192. The diameter of the case bearing inner races 206 defines an interior dimension. In the preferred embodiment, the interior dimension of the case bearing 192 is greater than the exterior dimension of the shaft bearing 190. In addition, in the preferred embodiment, the radial planes defined by the shaft bearing ball ring 200 and the case bearing ball ring 210 are coplanar (see FIG. 5). That is to say, the shaft bearing 190 and the case bearing 192 are concentrically positioned relative to one another. In this way, the spacer 194 can be dimensioned to allow common commercially available ball bearings to be fixed together relatively easily and inexpensively. As will become apparent from the discussion below, neither the relative sizes of the interior and exterior dimensions, the use of a separate spacer 194, nor the coplanar configuration of the ball rings 200 and 210 are critical to the present invention, and these features could take on many different configurations.

The case bearing outer race 208 is fixed relative to the case 32. It is believed this staged bearing arrangement—i.e. the inner race 196 of the shaft bearing 190 fixed relative to the shaft 114, the outer race 208 of the case bearing 192 fixed relative to the case 32 and the outer race 198 of the shaft bearing 190 fixed relative to the inner race 206 of the case bearing 192—provides the bearing assembly 116 with overall synergistic benefits that either a single bearing or unstaged bearing combinations cannot provide. That is to say, it is believed that the exploitation of any one advantage in a single bearing or unstaged combination is often limited by a similar reduction of another advantage. That is, exploiting a beneficial design characteristic in a traditional single bearing or unstaged bearing combination typically involves another beneficial design characteristic to be sacrificed. In the staged bearing arrangement, one bearing could be designed to exploit one advantage over another—for example the shaft bearing 190 could be designed to withstand a large radial load at a thrust at the expense of lowering the rotational speed at which the shaft balls 202 lose stabilization and start to skid along the pitch line. At the same time, the other bearing could be designed to take advantage of what was sacrificed in the first bearing—for example, the case bearing 192 could be designed to maintain its stabilization point at very high rotational speeds. Accordingly, the staged bearing arrangement of the previous example could both withstand a large radial load at a thrust and maintain its stabilization point at very high rotational speeds. It is further believed that this staged bearing arrangement also reduces the variances in the velocities of the balls 202 and 212 at the outer periphery—for example along the pitch line—relative to the velocity of the balls 202 and 212 at their centers. It is believed that reducing these variances also reduces the points of friction—or skidding—of the balls 202 and 212 relative to the races and cages, thereby increasing the overall life of the bearing assembly 116.

As previously discussed, the bearing assembly 118 is a virtual mirror image of the bearing assembly 116. It will be understood that the bearing assembly 118, therefore, is similarly constructed as was detailedly described above regarding the bearing assembly 116.

Figure 6:
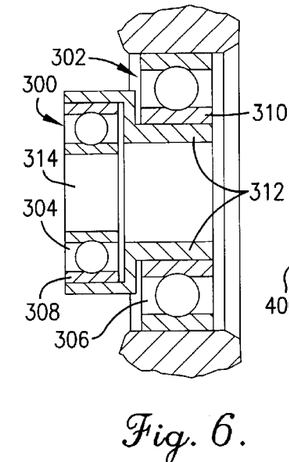
FIG. 6 is an enlarged, fragmentary cross-sectional view of an alternative embodiment of the present invention, wherein the ball ring planes are offset relative to one another and the exterior dimension of the shaft bearing is greater than the interior dimension of the case bearing inner race.

It is noted that the principles of the present invention are equally applicable to multiple bearing arrangements utilized to rotatably support any shaft on a stationary body and are not just limited to supercharger applications. In addition, the principles of the present invention are equally applicable to various other supercharger configurations and alternative multiple bearing arrangements. For example, the type of bearings utilized in the staged arrangement could be other than ball type bearings, including roller bearings (cylindrical or tapered), needle bearings, or journal bearings. Different types of bearings could be staged together, for example, a ball bearing staged in a journal bearing. Certain features of the bearings implemented in the staged arrangement could vary, for example, the bearings could be pre-lubricated bearings. The arrangement could utilize filling or non-filling type bearings. The bearings could also include additional features, such as self-alignment or angular contact capabilities. In addition, the number of bearings that are staged (fixed relative to one another) could include more than two. Furthermore, the configuration of the bearing arrangement could take on many different alternative forms one possible alternative to the configuration of the bearing arrangement is shown in FIG. 6. Particularly, the multiple bearing arrangement includes a shaft bearing 300 and a case bearing 302. The bearings 300 and 302 are configured very similar to the bearings 190 and 192 of the preferred embodiment. However, in this alternative embodiment the shaft bearing ball ring 304 defines a general plane that is not coplanar with the corresponding plane of the case bearing ball ring 306, but is significantly offset therefrom. In addition, the exterior dimension defined by the diameter of the outer race 308 of the shaft bearing 300 is greater than the interior dimension defined by the diameter of the inner race 310 of the case bearing 302. In this embodiment, the spacer 312 is configured to correspond to the offset positioning of the shaft bearing 300. That is to say the spacer 312 has a generally tubular shape with opposing ends of differing diametrical dimensions and a tiered circumferential surface (see FIG. 6). The spacer 312 is dimensioned to allow the case bearing 302 and spacer 312 to have an inside diameter sufficiently greater (at its smallest diametric span) than the outside diameter of the shaft 314, thereby providing the necessary clearance to mount the bearing arrangement onto the shaft 314.

Figures 7, 8:
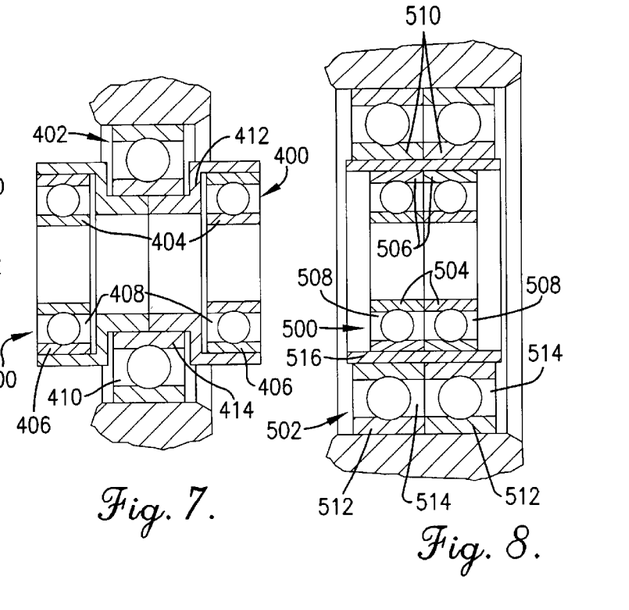
FIG. 7 is an enlarged, fragmentary cross-sectional view of a third embodiment of the present invention, wherein the shaft bearing has dual inner and outer races spaced apart from each other and the case bearing is located between the dual races.
FIG. 8 is an enlarged, fragmentary cross-sectional view of a fourth embodiment of the present invention, wherein both the shaft and case bearings has dual races and each ball ring of the shaft bearing is generally coplaner with a respective one of the ball rings of the case bearing.

A second alternative to the configuration of the bearing arrangement is shown in FIG. 7. Particularly, the multiple bearing arrangement includes a shaft bearing 400 and a case bearing 402, configured in a manner similar to the bearings 190 and 192 of the preferred embodiment. In this alternative embodiment, the shaft bearing includes dual inner races 404, dual outer races 406, and dual ball rings 408. As with the alternative embodiment shown in FIG. 6, the dual ball rings 408 each define a general plane that is offset from the corresponding plane of the case bearing ball ring 410. In this alternative embodiment, the dual inner races 404 are separated, or spaced apart from one another, and flank the case bearing 402 (see FIG. 7). That is to say the case bearing 402 is positioned between the two inner races 404. The dual outer races 406 and the dual ball rings 408 are configured in a similar, flanking orientation, relative to the case bearing 402. The spacer 412 is configured in a manner similar to the spacer 312 of the previous alternative embodiment; however, the spacer 412 has a double tiered circumferential surface corresponding to the dual outer races 406 of the shaft bearing 400 (see FIG. 7). The spacer 412 is fixed relative to both of the dual outer races 406 of the shaft bearing 400 and fixed relative to the inner race 414 of the case bearing 402.

A third alternative embodiment of the configuration of the bearing arrangement is shown in FIG. 8. In this embodiment, both the shaft bearing 500 and the case bearing 502 include dual components. That is, the shaft bearing 500 includes dual inner races 504, dual outer races 506 and dual ball rings 508. Similarly, the case bearing 502 includes dual inner races 510, dual outer races 512 and dual ball rings 514. As with the previously discussed embodiments, the inner races 504 and 510, the outer races 506 and 512, and the ball rings 508 and 514 are configured in a manner similar to the configuration of those corresponding components in the preferred embodiment. Unlike the previous alternative embodiments, however, the exterior dimension defined by the outer races 506 of the shaft bearing 500 is less than (so as to fit concentrically within) the interior dimension defined by the inner races 510 of the case bearing 502 (see FIG. 8). The shaft bearing ball rings 508 each define a plane that is generally coplanar with the plane defined by the corresponding case bearing ball ring 514 (see FIG. 8). The dual components of the case bearing 502 could also be configured in a spaced apart orientation, similar to the dual components of the shaft bearing 400 of the alternative embodiment illustrated in FIG. 7. That is to say, the multiple bearing arrangement could be configured so the dual components of the case bearing 502 have a flanking orientation with the shaft bearing 500 positioned between the dual components of the case bearing 502. The spacer 516 has a tubular configuration similar to the spacer 194 of the preferred embodiment; however, the spacer 516 has an axial dimension greater than the axial dimension of the spacer 194 to allow the spacer 516 to be fixed relative to both of the outer races 506 of the shaft bearing 500 and to both of the inner races 510 of the case bearing 502.

Figure 9:
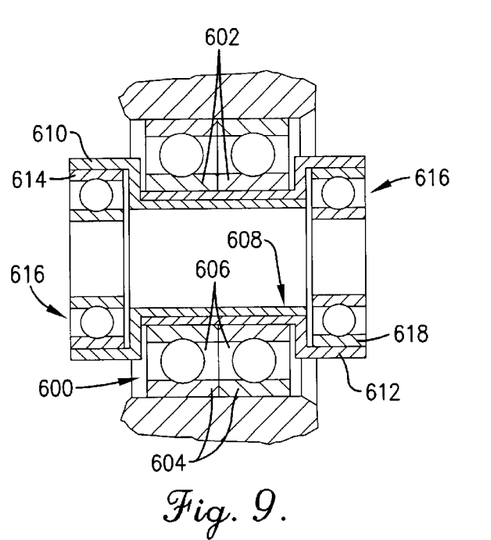
FIG. 9 is an enlarged, fragmentary cross-sectional view of a fifth embodiment of the present invention, which is similar to the embodiment shown in FIG. 7 in the sense that the shaft bearings have dual races, and present an external dimension larger than the internal dimension of the case bearing, however, the shaft bearings are located on opposite sides of the case bearing.

A fourth alternative embodiment of the configuration of the bearing arrangement is shown in FIG. 9. This alternative embodiment has a bearing arrangement similar to the arrangement illustrated in FIG. 7; however, in this embodiment the case bearing 600 has dual inner races 602, dual outer races 604 and dual ball rings 606. The spacer 608 has a double tiered circumferential surface similar to the configuration of the spacer 412 of the embodiment illustrated in FIG. 7; however, the spacer 608 has an axial dimension greater than the axial dimension of the spacer 412 to allow the spacer 608 to be fixed relative to both of the inner races 602 of the case bearing 600. Differing from the construction of the spacers of the previously discussed embodiments, the spacer 608 has a two-piece construction. That is to say, the spacer 608 includes a first tube portion 610 and a second tube portion 612 (see FIG. 9). Each of the tube portions 610 and 612 have a single tiered circumferential surface similar to the configuration of the spacer 312 of the embodiment illustrated in FIG. 6. The first tube portion 610 is fixed relative to the first outer race 614 of the shaft bearing 616 and fixed relative to both of the dual inner races 602 of the case bearing 600 (see FIG. 9). The second tube portion 612 is fixed relative to the second outer race 618 of the shaft bearing 616. Both of the tube portions 610 and 612 are fixed relative to each other along the circumferential surfaces having the smallest tier diameter. That is to say the end of the second tube portion 612 opposing the second outer race 618 fits into the end of the first tube portion 610 opposing the first outer race 614. The exterior circumferential surface of the second tube portion 612 is fixed relative to (and contiguous with) the interior circumferential surface of the first tube portion 610.

Figure 10:
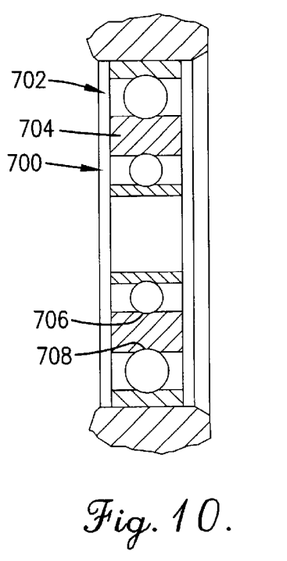
FIG. 10 is an enlarged, fragmentary cross-sectional view of a sixth embodiment of the present invention, wherein the outer race of the shaft bearing and the inner race of the case bearing are integrally formed as a unitary body.

All of the embodiments previously discussed utilize some form of a spacer that is separate and distinct from the bearings but interconnects the respective components of the shaft and case bearings. However, the shaft bearing and the case bearing can also be fixed together utilizing various alternative spacer designs or directly affixing the two bearings together without implementing a spacer. One alternative design is shown in FIG. 10, wherein the race of the shaft bearing 700 and the inner race of case bearing 702 are integrally formed (e.g., machined as a unitary body 704. That is to say, the body 704 includes an inner groove 706 and an outer groove 708.

Turning now to FIGS. 11–15, a centrifugal compressor 800 is depicted as a seventh embodiment of the present invention. The compressor 800 is similar in many respects to the supercharger 20 illustrated in FIGS. 1–5 and, in fact, the compressor 800 is most preferably used as a supercharger in a vehicle (not shown). That is, the compressor 800 is most preferably connected to a vehicle engine to be powered thereby and supply boost pressure thereto in the same manner as that described in the first embodiment. However, similar to the first embodiment, the compressor 800 may also be utilized in other applications (such as industrial applications in which high pressure is desired, e.g., a process in which the compressor is powered by an electric motor to supply high pressure gas to a location).

Figure 11:
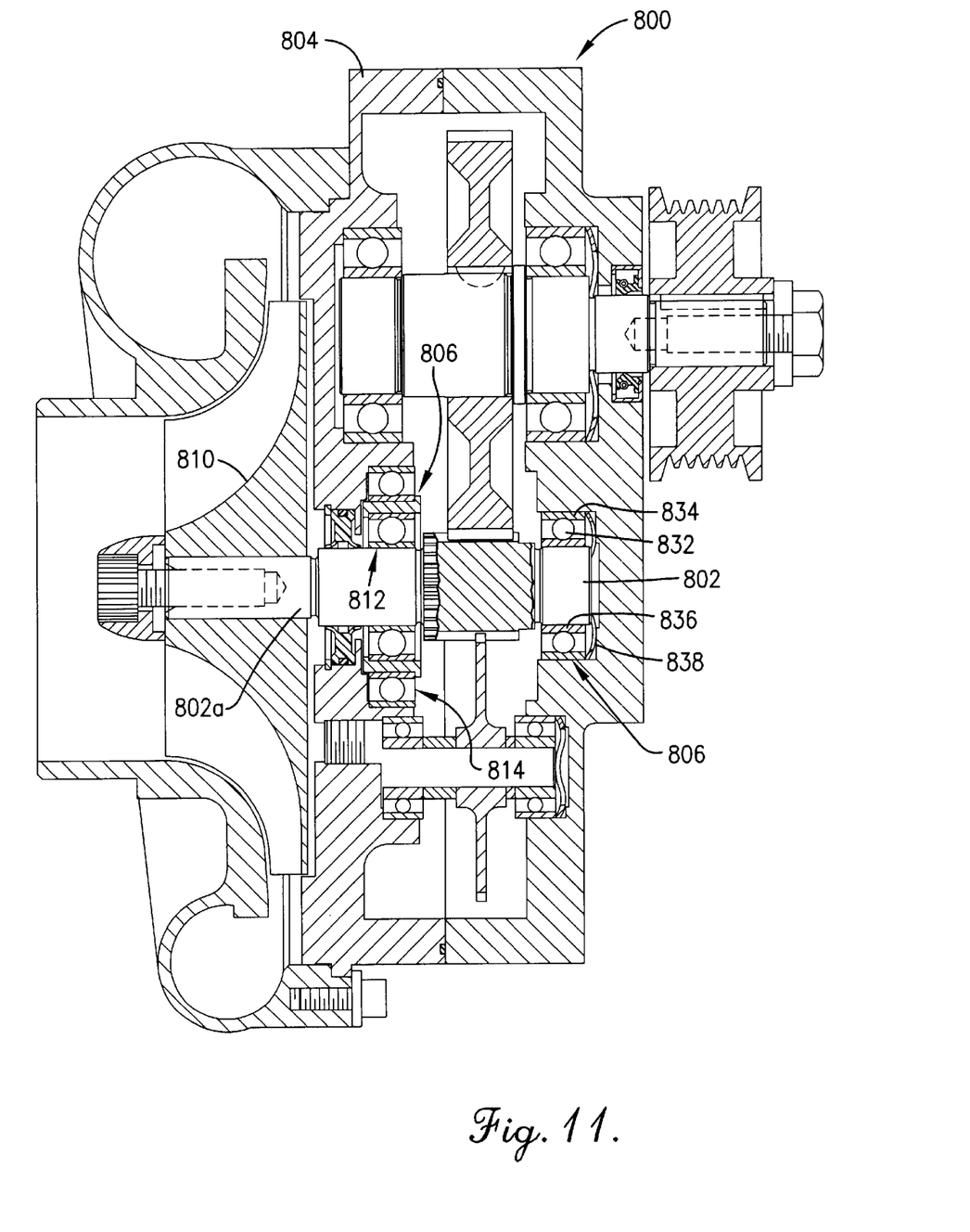
FIG. 11 is a cross-sectional view of a centrifugal compressor similar to that shown in FIG. 4, depicting a seventh embodiment of the present invention wherein the impeller shaft is supported by a single compound bearing assembly.
Figure 12:
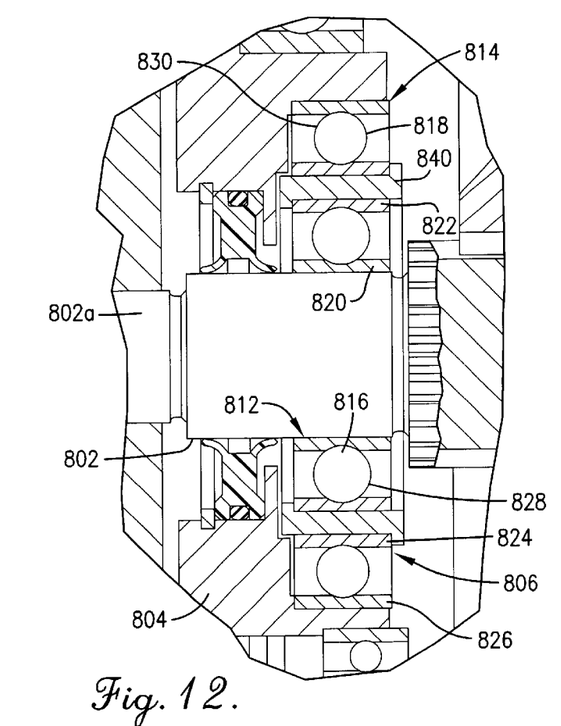
FIG. 12 is a greatly enlarged, fragmentary, cross-sectional view of the centrifugal compressor depicted in FIG. 11, particularly illustrating the single compound bearing assembly for the impeller shaft.

Those ordinarily skilled in the art will appreciate that the supercharger 800 is similar in many respects to the supercharger 20 (e.g., compare FIGS. 4 and 11). It shall therefore be sufficient to describe the supercharger 800 principally with respect to its distinctions relative to the supercharger 20.

The impeller shaft 802 is preferably supported on the case 804 by a compound bearing assembly 806 and a single bearing assembly 808 (see FIG. 11). The bearing assembly 808 is located at one end of the shaft 802 and the compound bearing assembly 806 is spaced between the opposite end of the shaft 802 and the assembly 808. In this regard, the shaft presents a cantilevered section 802a on which the impeller 810 is supported (with the cantilevered section 802a being defined between the compound bearing assembly 806 and the left end of the shaft 802 (when viewing FIG. 11)). It is noted that the impeller 810 is cantilevered similar to the first embodiment. The preferred supercharger 800 is also similar to the first embodiment in the sense that the spacing between the bearing assemblies 806 and 808 is less than the diameter of the impeller 810. The relative spacing of the bearing assemblies 806 and 808 defines the vertex of the rocking motion of the impeller 810, and the illustrated arrangement assists in limiting the actual movement of the impeller 810 relative to the case 804. This is particularly important with the illustrated compound bearing assembly 806, as it is susceptible to as much as ten times the amount of internal play than a standard single bearing assembly.

As previously noted with respect to the first embodiment, the impeller shaft 802 is rotated at incredibly fast speeds and experiences extreme accelerations. For example, the shaft velocity at the compound bearing assembly 806 (measured at the outer surface of the shaft 802 or the inner shaft-engaging surface of the shaft bearing 812) equals or exceeds about five thousand five hundred (5500) fpm during normal impeller operation. Furthermore, the shaft can be accelerated as much as 80,000 rpm in less than a second. It has heretofore been believed that such operating conditions exceed virtually all known bearing limitations, except in the case of extremely expensive and uniquely configured (e.g., ceramic) high speed bearings. For example, the impeller shaft 802 normally operates at speeds in excess of three times the limiting speeds of standard bearings, which creates centrifugal loads that are up to ten times the acceptable loads corresponding to the limiting speeds of standard bearings.

The compound bearing assembly 806 is similar in many respects to that shown in the first embodiment. However, attention is specifically directed to the relative ball sizes of the shaft bearing 812 and case bearing 814. It is specifically noted that the common diameter of the balls 816 of the shaft bearing 812 is preferably equal to or greater than the common diameter of the balls 818 of the case bearing 814. With particular respect to the illustrated embodiment, the balls 816 of the shaft bearing 812 are slightly larger than the balls 818 of the case bearing 814 (e.g., see FIG. 12). It may be said that the illustrated shaft bearing 812 is slightly oversized. In fact, it has been determined that the shaft bearing 812 may be a standard 300 Series bearing (which is typically used only for low speed applications), while the case bearing 814 may be a standard 9100 Series bearing (which is typically used for higher speeds than the 300 Series bearing).

It is important to note the general construction of the compound bearing assembly 806. Particularly, the shaft bearing 812 is radially inside the case bearing 814. Moreover, the inner race 820 of the shaft bearing 812 is fixed on the shaft 802, the outer race 826 of the case bearing 814 is fixed to the case 804, and the outer race 822 of the shaft bearing 812 and the inner race 824 of the case bearing 814 are fixed relative to one another. There is no positive driving connection between the relatively fixed races 822,824 and the races 820 and 826. That is to say, the relatively fixed races 822,824 are independent of the ball rings 828,830 and the innermost and outermost races 820 and 826, except for frictional and hydraulic coupling therebetween. Thus, for the outer case bearing 814 to share the rotational and accelera-tion loads of the shaft 802, the relatively fixed races 822,824 must be rotated. It is now believed that the somewhat "oversized" arrangement of the shaft bearing 812 assists the case bearing 814, which is radially outward from the shaft bearing 812, in absorbing the accelerations of the impeller shaft 802.

It is also noted that the single bearing assembly 808 has balls 832 that are relatively smaller than the balls 816 of the shaft bearing 812. Most preferably, the single bearing assembly 808 weighs less than the shaft bearing 812. It is believed that such a configuration facilitates relatively light preloading of the bearing assemblies 806 and 808. It has been particularly determined that the compound bearing assembly 806 can be lightly preloaded while ensuring that the shaft and case bearings 812 and 814 share the impeller shaft velocity and acceleration. In this regard,.by sizing the bearing assembly 808 in the preferred manner, the bearing assembly 808 does not require a relatively large preload (which may in fact be in excess of the preload desired for the compound bearing assembly 806). In fact, the principles of the present invention are applicable to an arrangement where the bearing assemblies 806 and 808 are not preloaded; that is, substantially no preload (e.g., about zero pounds preload) is provided for the bearing assemblies 806 and 808. In such an arrangement, the outer race 834 of the bearing assembly 808 may be loosely contained within the case 804, with the inner race 836 being fixed to the impeller shaft 802.

It has been determined that the most preferable preload of the compound bearing assembly 806 is limited according to the weight of the outer case bearing 814. In particular, the bearing assemblies 806 and 808 are preloaded to a preload amount, wherein the preload amount is calculated according to the equation: preload amount$\leq 38 \times$(case bearing weight)$^{0.82}$. It is noted that the preload in the illustrated embodiment is provided by a wavy spring 838, although other suitable techniques (e.g., a coil spring, etc.) may be used.

The use of the relatively small bearing assembly 808 is also applicable to a compound bearing assembly located at the end of the shaft 802 opposite the impeller 810 (similar to the first embodiment). In such an arrangement, the inner shaft bearing of the compound bearing assembly (not shown) is preferably lighter than the inner shaft bearing 812 of the compound bearing assembly 806.

Note, the illustrated shaft and case bearings 812 and 814 are both traditional radial bearings. It is has been determined that use of a radial bearing as either the shaft bearing 812 or the case bearing 814 is permissible in the compound bearing assembly 806, even in conditions in which the ball pitch line velocity of such radial bearing is at least about 5500 fpm during normal operation of the impeller 810. Furthermore, the bearings 812 and 814 preferably both use steel balls 816 and 818. Such a configuration permits at least one of the bearings 812 or 814 to have a ball pitch line velocity that is equal to or greater than 8000 fpm during normal impeller operation. It is believed that the shaft and case bearings 812 and 814 may alternatively be configured for grease-packed lubrication; that is, the bearings 812 and 814 are not limited to the illustrated misting lubrication, but rather suitable sealed, greased configurations are entirely within the ambit of the present invention.

The illustrated coupler 840 fixedly interconnecting the outer race 822 of the shaft bearing 812 and the inner race 824 of the case bearing 814 is preferably formed of a material having a greater coefficient of thermal expansion than the coefficient(s) of thermal expansion for the material(s) forming the races 822 and 824. In addition, the coupler 840 weighs less than the race 822 and the race 824. Most preferably, the coupler 840 is formed of aluminum (or in some instances plastic) and the races 822 and 824 are formed of similar steel (thus, the coefficient of thermal expansion for the races 822 and 824 is the same). Moreover, the weight of the coupler 840 is equal to or less than about fifteen percent (15%) of the aggregate weight of the races 822 and 824. Such an arrangement permits the coupler 840 to be formed of a relatively low density material, but ensures that thermal expansion of the coupler 840 does not distort or affect operation of the bearings 812 and 814.

It has further been determined that the bearings 812 and 814 may utilize relatively conventional, low speed cage configurations without adversely limiting the speeds and accelerations of the impeller shaft 802. Particularly, each of the bearing assembly 812 and 814 may be provided with a conventional nylon or pressed steel cage (not shown). Those ordinarily skilled in the art will appreciate that a nylon cage typically includes a cylindrical wall presenting a plurality of ball-receiving openings therein. The wall is formed of nylon. The term "pressed steel" as used herein encompasses any traditional steel cage having interconnected sections that are formed of steel and cooperatively present ball-receiving openings. The steel sections are connected by any suitable means (e.g., rivets, tangs, etc.).

Figure 13:
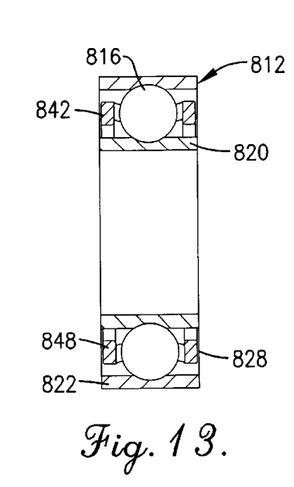
FIG. 13 is an even further enlarged cross-sectional view of the shaft bearing of the compound bearing assembly depicted in FIGS. 11 and 12, particularly depicting the inventive cage used in the shaft bearing.
Figures 14, 15:
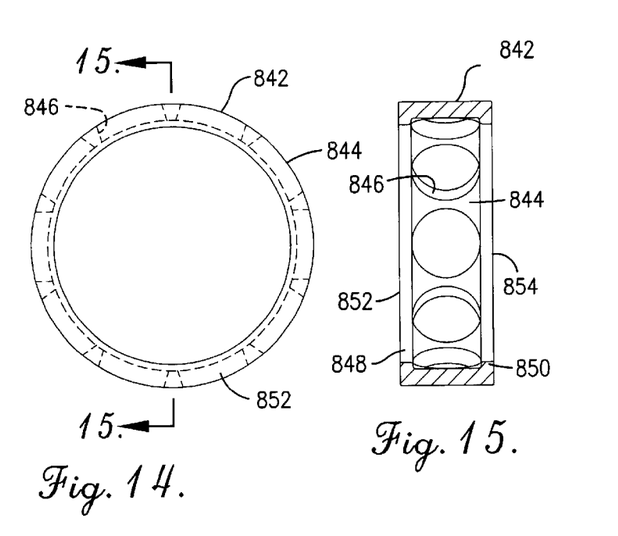
FIG. 14 is a side elevational view of the cage depicted in FIG. 13.
FIG. 15 is a cross-sectional view of the cage taken along line 15—15 of FIG. 14, particularly illustrating the circumferentially extending, radial projections.

The principles of the present invention are equally applicable to an inventive cage design as depicted in FIGS. 13–15. In the illustrated embodiment, the shaft bearing 812 includes the inventive cage 842 and the case bearing 814 utilizes one of the aforementioned conventional cage constructions, although the principles of the present invention are equally applicable to use of the cage 842 in both bearings 812 and 814. In fact, the cage 842 may also be used in the bearing assembly 808 if desired. The cage 842 includes an annular wall 844 presenting a plurality of ball-receiving openings 846 (each of which rotatably receives one of the balls 816 therein). A pair of radial projections 848 and 850 preferably extend along respective sides 852 and 854 of the wall, so as to position the openings 846 between the projections 848 and 850. The preferred projections 848 and 850 extend radially inward from the wall 844, although the principles of the present invention are equally applicable to projections that extend radially outward relative to the wall. Furthermore, the projections 848 and 850 preferably extend entirely about the circumference of the wall. The cage 842 is most preferably formed of bronze. As perhaps best shown in FIG. 15, each of the illustrated projections 848 and 850 has a rectangular shape, although other suitable shapes (e.g., projections having radially innermost rounded edges, pointed edges, etc.) are entirely within the ambit of the present invention. It is believed that the inventive cage 842 permits the bearing 812 to have a ball pitch line velocity of at least about 9000 fpm during normal operation of the impeller 810.

Again, the illustrated embodiment permits the use of traditional bearings. For example, it has been determined that a supercharger utilizing an impeller having a diameter of six inches may utilize off-the-shelf bearings from the New Hampshire Bearing Company, wherein the shaft bearing 812 is Part No. ME1305DL, the case bearing 814 is Part No. ME1113DL, and the bearing assembly 808 is ME1203DL.

Furthermore, in some instances, the standard bearing assemblies are not appropriately dimensioned, with the outer diameter of the intended shaft bearing being greater than the inner diameter of the intended case bearing. It has been determined that one or both of the bearings may be machined (e.g., the outer race of the intended shaft bearing may be turned down and/or the inner race of the intended case bearing may be widened) so that the shaft bearing fits within the case bearing. The outer race of the shaft bearing and the inner race of the case bearing are then fixed relative to one another (e.g., fixedly interconnecting a coupler therebetween). The inner race of the shaft bearing is fixed to the shaft and the outer race of the case bearing is fixed to the case.

Figure 16:
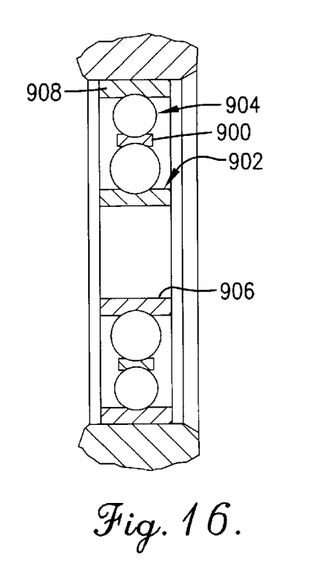
FIG. 16 is an enlarged, fragmentary cross-sectional view of a compound bearing assembly similar to that shown in FIG. 10, depicting an eighth embodiment of the present invention that differs from the sixth embodiment in the relative sizes of the common race assembly, the inner race of the shaft bearing, and the outer race of the case bearing.

In FIG. 16, an integrally formed common race assembly 900 for the shaft bearing 902 and case bearing 904 is depicted. It will be appreciated that this construction is similar to that shown in FIG. 10. Moreover, the weight of the common race assembly 900 is equal to or less than about one and one half times the weight of the inner race 906 of the shaft bearing 902. The outer race 908 of the case bearing 904, the inner race 906 of the shaft bearing 902, and the common race assembly 900 are all preferably formed of steel.

The preferred forms of the invention described above are to be used as illustration only, and should not be utilized in a limiting sense in interpret the scope of the present invention. Obvious modifications to the exemplary embodiments, as herein set forth, could be readily made by those skilled in the art without depart from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A compressor comprising:
   a case;
   a rotatable impeller operable to compress a fluid within the case when rotated;
   a shaft fixed relative to the impeller; and
   a compound bearing assembly rotatably supporting the shaft on the case,
   said compound bearing assembly including a shaft bearing and a case bearing,
   said shaft and case bearings each including relatively moveable inner and outer races, a cage, and a plurality of balls rotatably positioned within the cage between the races,
   said inner race of the shaft bearing being fixed relative to the shaft, said outer race of the case bearing being fixed relative to the case, and said outer race of the shaft bearing and inner race of the case bearing being fixed relative to one another,
   at least one of the cages of the bearings being selected from the group consisting of a nylon cage that is formed of nylon and presents a plurality ball-receiving openings, and a steel cage that includes a pair of interconnected sections which are formed of steel and cooperatively present a plurality of ball-receiving holes,
   said at least one of the cages being associated with a respective one of the bearings that has a ball pitch line velocity of at least about 3000 fpm during operation of the impeller.

2. A compressor as claimed in claim 1,
   said case bearing being located radially outward from the shaft bearing,
   said at least one of the cages being the cage of the case bearing.

3. A compressor as claimed in claim 1, said interconnected sections of the steel cage being at least substantially similar in construction, said steel cage including a plurality of rivets that interconnect the sections to one another.

4. A compressor comprising:

a case;

a rotatable impeller operable to compress a fluid within the case when rotated;

a shaft that is fixed relative to the impeller and presents a rotational axis; and a compound bearing assembly rotatably supporting the shaft on the case, said compound bearing assembly including a shaft bearing and a case bearing, said shaft and case bearings each including relatively moveable inner and outer races, a cage, and a plurality of balls rotatably positioned within the cage between the races, said inner race of the shaft bearing being fixed relative to the shaft, said outer race of the case bearing being fixed relative to the case, and said outer race of the shaft bearing and inner race of the case bearing being fixed relative to one another, at least one of the bearings having a radial configuration, with the races of said at least one of the bearings presenting opposed ball-receiving grooves that are aligned along a radial line that projects at least substantially radially from the rotational axis, said at least one of the bearings having a ball pitch line velocity of at least about 5500 fpm during operation of the impeller.

5. A compressor as claimed in claim 4, said at least one of the bearings being both the case and shaft bearings, such that both bearings have the radial configuration.

6. A compressor as claimed in claim 4, each of said races of the at least one of the bearings being symmetrical relative to the radial line.

7. A compressor comprising:

a case;

a rotatable impeller operable to compress a fluid within the case when rotated;

a shaft fixed relative to the impeller; and a compound bearing assembly rotatably supporting the shaft on the case, said compound bearing assembly including a shaft bearing and a case bearing, said shaft and case bearings each including relatively moveable inner and outer races, a cage, and a plurality of balls rotatably positioned within the cage between the races, said inner race of the shaft bearing being fixed relative to the shaft, said outer race of the case bearing being fixed relative to the case, and said outer race of the shaft bearing and inner race of the case bearing being fixed relative to one another, said balls of each of the bearings being formed of steel, at least one of the bearings having a ball pitch line velocity of at least about 8000 fpm during operation of the impeller.

8. A compressor as claimed in claim 7, said cage of each of the bearings be formed of bronze.

9. A compressor as claimed in claim 7, each of said shaft and case bearings being grease packed.

10. A compressor comprising:

a case;

a rotatable impeller operable to compress a fluid within the case when rotated;

a shaft fixed relative to the impeller; and a compound bearing assembly rotatably supporting the shaft on the case, said compound bearing assembly including a shaft bearing and a case bearing, said shaft and case bearings each including relatively moveable inner and outer races, a cage, and a plurality of balls rotatably positioned within the cage between the races, said inner race of the shaft bearing being fixed relative to the shaft, said outer race of the case bearing being fixed relative to the case, and said outer race of the shaft bearing and inner race of the case bearing being fixed relative to one another, at least one of the cages including an annular wall that presents a plurality ball-receiving openings, said at least one of the cages further including a pair of radial projections extending at least substantially around the circumference of the wall, with the ball-receiving openings being located between the projections.

11. A compressor as claimed in claim 10, said at least one of the cages being associated with a respective one of the bearings, with the respective one of the bearings having a ball pitch line velocity of at least about 9000 fpm during operation of the impeller.

12. A compressor as claimed in claim 10, said shaft bearing being located radially inward from the case bearing, said at least one of the cages being the cage of the shaft bearing.

13. A compressor as claimed in claim 10, said at least one of the cages being formed of bronze.

14. A compressor as claimed in claim 10, said annular wall presenting oppositely facing, cylindrically shaped inner and outer surfaces.

15. A compressor as claimed in claim 14, said projections extending entirely around the circumference of the wall.

16. A compressor as claimed in claim 14, said projections extending radially inward from the inner surface of the annular wall.

17. A compressor as claimed in claim 14, said annular wall presenting opposite, parallel side edges, with the ball-receiving openings being spaced between the side edges, said projections being located along the side edges.

18. A centrifugal supercharger for supercharging an engine of a vehicle, said supercharger comprising:

a case;

a rotatable impeller operable to compress induction fluid for the engine when rotated;

a shaft fixed relative to the impeller and drivingly connectable to the engine; and a compound bearing assembly rotatably supporting the shaft on the case, said compound bearing assembly including a radially innermost race fixed relative to the shaft, a radially outermost race fixed relative to the case, and an integrally formed common race assembly spaced radially between the innermost and outermost races, said common race assembly being moveable relative to the innermost and outermost races, said common race assembly presenting an inside race associated with the innermost race and an outside race associated with the outermost race, said innermost race weighing a first weight, and said common race assembly weighing a second weight that is equal to or less than about one and one-half times the first weight.

19. A supercharger as claimed in claim 18, said innermost race, outermost race, and race assembly being formed of the same material.

20. A supercharger as claimed in claim 19, said same material being steel.

21. A supercharger as claimed in claim 18, said shaft presenting a cantilevered section, said impeller being located on the cantilevered section.

22. A supercharger as claimed in claim 18, said compound bearing assembly including a pair of ball rings, one of which is interposed between the inside and innermost races and the other of which is interposed between the outside and outermost races, each of said ball rings including a cage and a plurality of balls rotatably positioned within the cage between the respective races.

23. A method of rotatably mounting an impeller shaft of a centrifugal supercharger in a supercharger case, said method comprising the steps of:

(a) providing a case bearing having an inner diameter;

(b) providing a shaft bearing having an outer diameter that is greater than the inner diameter;

(c) altering at least one of the bearings so that the outer diameter of the shaft bearing is smaller than the inner diameter of the case bearing, thereby permitting the shaft bearing to fit within the case bearing;

(d) fixing an inner race of the case bearing to an outer race of the shaft bearing;

(e) fixing an outer race of the case bearing to the case of the supercharger; and (f) fixing an inner race of the shaft bearing to the impeller shaft.

24. A method of mounting an impeller shaft of a centrifugal supercharger as claimed in claim 23, step (c) including the step of machining only one of the bearings.

25. A method of mounting an impeller shaft of a centrifugal supercharger as claimed in claim 23, step (d) including the step of fixing a spacer between the outer race of the shaft bearing and the inner race of the case bearing.

26. A centrifugal supercharger for supercharging an engine of a vehicle, said supercharger comprising:

a case;

a rotatable impeller operable to compress induction fluid for the engine when rotated;

a shaft fixed relative to the impeller and drivingly connectable to the engine; and a compound bearing assembly rotatably supporting the shaft on the case, said compound bearing assembly including a shaft bearing and a radially outward case bearing, said shaft and case bearings each including relatively moveable inner and outer races, with the inner race of the shaft bearing being fixed relative to the shaft and the outer race of the case bearing being fixed relative to the case, said compound bearing assembly including a coupler located between and fixedly interconnecting the outer race of the shaft bearing and the inner race of the case bearing, said coupler having a first coefficient of thermal expansion, said outer race of the shaft bearing having a second coefficient of thermal expansion, and said inner race of the case bearing having a third coefficient of thermal expansion, said first coefficient of thermal expansion being greater than the second and third coefficients of thermal expansion, said coupler weighing less than each of the outer race of the shaft bearing and the inner race of the case bearing.

27. A supercharger as claimed in claim 26, said coupler weighing a first weight, said outer race of the shaft bearing weighing a second weight, and said inner race of the case bearing weighing a third weight, said first weight being equal to or less than about fifteen percent of the sum of the second and third weights.

28. A supercharger as claimed in claim 26, said outer race of the shaft bearing and said inner race of the case being formed of the same material, such that the second and third coefficients of thermal expansion are the same.

29. A supercharger as claimed in claim 28, said outer race of the shaft bearing and said inner race of the case bearing being formed of steel.

30. A supercharger as claimed in claim 29, said coupler being formed of aluminum.

31. A supercharger as claimed in claim 29, said coupler being formed of plastic.

32. A supercharger as claimed in claim 26, said shaft presenting a cantilevered section, said impeller being located on the cantilevered section.

33. A supercharger as claimed in claim 26, said shaft and case bearings each including a ball ring that comprises a cage and a plurality of balls rotatably positioned within the cage between the respective races.

34. A centrifugal supercharger for supercharging an engine of a vehicle, said supercharger comprising:

a case;

a rotatable impeller operable to compress induction fluid for the engine when rotated;

a shaft fixed relative to the impeller and drivingly connectable to the engine; and a compound bearing assembly rotatably supporting the shaft on the case, said compound bearing assembly including a shaft bearing and a radially outward case bearing, said shaft and case bearings each including relatively moveable inner and outer races, a cage, and a plurality of balls rotatably positioned within the cage between the races, said inner race of the shaft bearing being fixed relative to the shaft, said outer race of the case bearing being fixed relative to the case, and said outer race of the shaft bearing and inner race of the case bearing being fixed relative to one another, said shaft bearing being a 300 Series bearing.

35. A supercharger as claimed in claim 34,
said shaft presenting a cantilevered section,
said impeller being located on the cantilevered section.

36. A centrifugal supercharger for supercharging an engine of a vehicle, said supercharger comprising:
a case;
a rotatable impeller operable to compress induction fluid for the engine when rotated;
a shaft fixed relative to the impeller and drivingly connectable to the engine; and
a pair of spaced apart bearing assemblies supporting the shaft on the case,
a first one of the pair of bearing assemblies comprising a compound bearing assembly that includes a first shaft bearing and a radially outward first case bearing,
a second one of the pair of bearing assemblies including a second shaft bearing,
said bearings each including relatively moveable inner and outer races, a cage, and a plurality of balls rotatably positioned within the cage between the races,
said inner race of the first shaft bearing being fixed relative to the shaft, said outer race of the first case bearing being fixed relative to the case, and said outer race of the first shaft bearing and inner race of the first case bearing being fixed relative to one another,
said inner race of the second shaft bearing being fixed relative to the shaft,
said second shaft bearing weighing less than the first shaft bearing.

37. A supercharger as claimed in claim 36,
said second bearing assembly including a second case bearing,
said second case bearing including relatively moveable inner and outer races, a cage, and a plurality of balls rotatably positioned within the cage between the races,
said outer race of the second case bearing being fixed relative to the case, and
said outer race of the second shaft bearing and inner race of the second case bearing being fixed relative to one another.

38. A supercharger as claimed in claim 36,
said outer race of the second shaft bearing contacting the case.

39. A supercharger as claimed in claim 36,
said shaft presenting a cantilevered section,
said impeller being located on the cantilevered section.

40. A supercharger as claimed in claim 39,
said shaft presenting opposite first and second ends,
said cantilevered section projecting from the first end from the first end of the shaft,
said second bearing assembly being adjacent the second end of the shaft,
said first bearing assembly being spaced along the shaft between the second bearing assembly and the first end.

41. A supercharger as claimed in claim 40,
said cantilevered section of the shaft being defined between the first end and the first bearing assembly.

42. A supercharger as claimed in claim 36,
said first case bearing weighing a first bearing weight,
said bearing assemblies being axially preloaded to a preload amount, wherein the preload amount is determined according to the equation:

preload amount≦38×(first bearing weight)0.82.

43. A centrifugal supercharger for supercharging an engine of a vehicle, said supercharger comprising:
a case;
a rotatable impeller operable to compress induction fluid for the engine when rotated;
a shaft fixed relative to the impeller and drivingly connectable to the engine; and
a compound bearing assembly rotatably supporting the shaft on the case,
said compound bearing assembly including a shaft bearing and a radially outward case bearing,
said shaft and case bearings each including relatively moveable inner and outer races, a cage, and a plurality of balls rotatably positioned within the cage between the races,
said inner race of the shaft bearing being fixed relative to the shaft, said outer race of the case bearing being fixed relative to the case, and said outer race of the shaft bearing and inner race of the case bearing being fixed relative to one another,
said case bearing presenting a case bearing weight,
said compound bearing assembly being axially preloaded to a preload amount, wherein the preload amount is determined according to the equation:

preload amount≦38×(case bearing weight)0.82.

44. A supercharger as claimed in claim 43,
said shaft presenting a cantilevered section,
said impeller being located on the cantilevered section.

45. A centrifugal supercharger for supercharging an engine of a vehicle, said supercharger comprising:
a case;
a rotatable impeller operable to compress induction fluid for the engine when rotated;
a shaft fixed relative to the impeller and drivingly connectable to the engine; and
a compound bearing assembly rotatably supporting the shaft on the case,
said compound bearing assembly including a shaft bearing and a radially outward case bearing,
said shaft and case bearings each including relatively moveable inner and outer races, with the inner race of the shaft bearing being fixed relative to the shaft, the outer race of the case bearing being fixed relative to the case, and the outer race of the shaft bearing and inner race of the case bearing being fixed relative to one another,
said compound bearing assembly being under substantially no axial preload.

46. A supercharger as claimed in claim 45,
said shaft presenting a cantilevered section,
said impeller being located on the cantilevered section.

47. A supercharger as claimed in claim 45,
said shaft and case bearings each including a ball ring that comprises a cage and a plurality of balls rotatably positioned within the cage between the respective races.

48. A centrifugal supercharger for supercharging an engine of a vehicle, said supercharger comprising:
a case;
a rotatable impeller operable to compress induction fluid for the engine when rotated;

a shaft fixed relative to the impeller and drivingly connectable to the engine
    said shaft presenting a cantilevered section, with the impeller being located on the cantilevered section; and
    a compound bearing assembly rotatably supporting the shaft on the case, said compound bearing assembly including a shaft bearing and a radially outward case bearing,
    said shaft and case bearings each including relatively moveable inner and outer races, with the inner race of the shaft bearing being fixed relative to the shaft, the outer race of the case bearing being fixed relative to the case, and the outer race of the shaft bearing and inner race of the case bearing being fixed relative to one another,
    said inner race of the shaft bearing presenting an inside shaft-engaging surface,
    said shaft-engaging surface being rotated at speeds of at least about 5500 fpm during operation of the impeller.

49. A supercharger as claimed in claim 48,
said shaft and case bearings each including a ball ring that comprises a cage and a plurality of balls rotatably positioned within the cage between the respective races.

50. A supercharger as claimed in claim 48,
said cantilevered section of the shaft being defined between a first end of the shaft and the compound bearing assembly.

51. A centrifugal supercharger for supercharging an engine of a vehicle, said supercharger comprising:
a case;
a rotatable impeller operable to compress induction fluid for the engine when rotated;
a shaft fixed relative to the impeller and drivingly connectable to the engine,
    said shaft presenting a cantilevered section, with the impeller being located on the cantilevered section; and
    a compound bearing assembly rotatably supporting the shaft on the case,
    said compound bearing assembly including a shaft bearing and a radially outward case bearing,
    said shaft and case bearings each including relatively moveable inner and outer races, a cage, and a plurality of balls rotatably positioned within the cage between the races,
    said inner race of the shaft bearing being fixed relative to the shaft, said outer race of the case bearing being fixed relative to the case, and said outer race of the shaft bearing and inner race of the case bearing being fixed relative to one another,
    said balls of the shaft bearing presenting a first common diameter and said balls of the case bearing presenting a second common diameter, with the first common diameter being equal to or greater than the second common diameter.

52. A supercharger as claimed in claim 51,
said cantilevered section of the shaft being defined between a first end of the shaft and the compound bearing assembly.

53. A centrifugal supercharger for supercharging an engine of a vehicle, said supercharger comprising:
a case;
a rotatable impeller operable to compress induction fluid for the engine when rotated;
a shaft fixed relative to the impeller and drivingly connectable to the engine; and
a pair of spaced apart bearing assemblies supporting the shaft on the case,
a first one of the pair of bearing assemblies comprising a compound bearing assembly that includes a first shaft bearing and a radially outward first case bearing,
a second one of the pair of bearing assemblies including a second shaft bearing,
    said bearings each including relatively moveable inner and outer races,
    said inner race of the first shaft bearing being fixed relative to the shaft, said outer race of the first case bearing being fixed relative to the case, and said outer race of the first shaft bearing and inner race of the first case bearing being fixed relative to one another,
    said inner race of the second shaft bearing being fixed relative to the shaft, and said outer race of the second shaft bearing contacting the case.

54. A supercharger as claimed in claim 53,
said second shaft bearing weighing less than the first shaft bearing.

55. A supercharger as claimed in claim 53,
said bearings each including a ball ring that comprises a cage and a plurality of balls rotatably positioned within the cage between the respective races.

56. A supercharger as claimed in claim 53,
said shaft presenting a cantilevered section,
said impeller being located on the cantilevered section.

57. A supercharger as claimed in claim 56,
said shaft presenting opposite first and second ends,
said cantilevered section projecting from the first end from the first end of the shaft,
said second bearing assembly being adjacent the second end of the shaft,
said first bearing assembly being spaced along the shaft between the second bearing assembly and the first end.

58. A supercharger as claimed in claim 57,
said cantilevered section of the shaft being defined between the first end and the first bearing assembly.

* * * * *